J. S. WOOD.
GAS APPARATUS FOR RAILROAD CARS, &c.
No. 105,756. Fig. 1. Patented July 26, 1870.
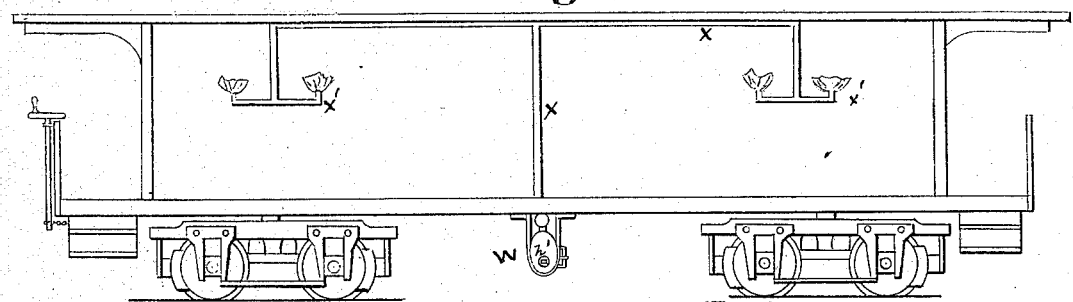
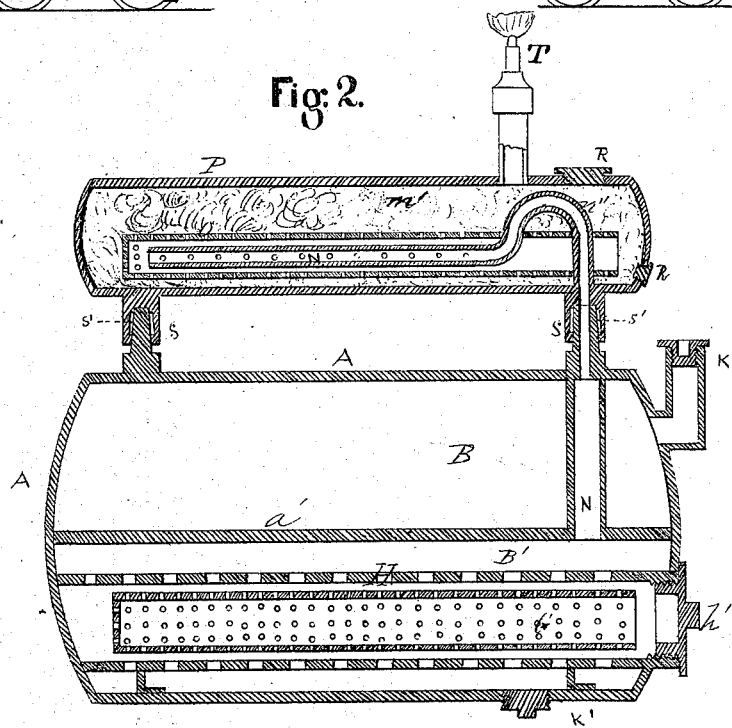
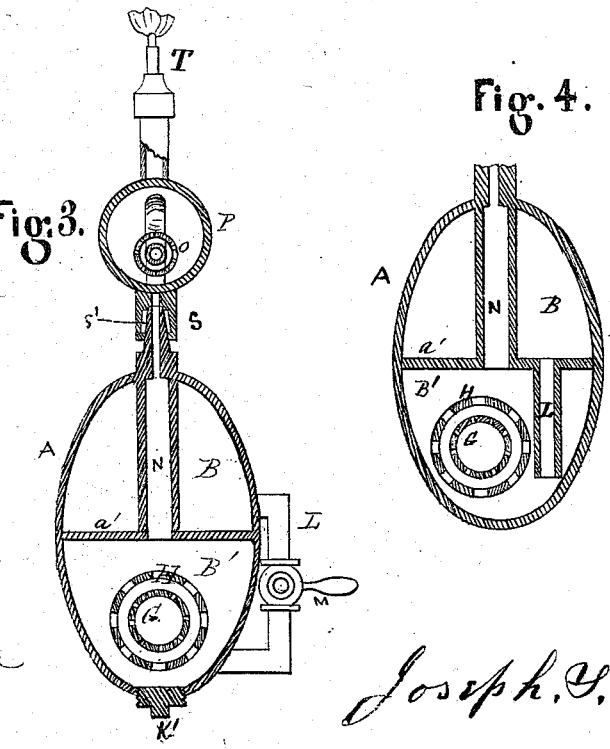
Witnesses: Edw. Brown, Jos. Raby
Joseph S. Wood

United States Patent Office.

JOSEPH S. WOOD, OF PHILADELPHIA, PENNSYLVANIA, ASSIGNOR TO HIMSELF AND JOHN J. CARBERRY, OF SAME PLACE.

Letters Patent No. 105,756, dated July 26, 1870.

---

IMPROVEMENT IN GAS APPARATUS FOR RAILROAD CARS, &c.

---

The Schedule referred to in these Letters Patent and making part of the same.

---

I, JOSEPH S. WOOD, of the city and county of Philadelphia and State of Pennsylvania, have invented an Improved "Gas Apparatus for Railroad Cars," of which the following is a specification.

The nature of my invention, which is an improvement on my patent of July 5, 1870, No. 101,558, consists in the horizontal construction and arrangement of the machine, so as to adapt it to illumination of railroad or city horse-cars. The machine is in two parts, in one of which the hydrogen gas is formed; in the other it is carbureted, ready for illuminating the car.

To enable others skilled in the art to make and use my invention, I will now proceed to describe its construction and operation, reference being had to the accompanying drawing, in which—

Figure 1 is a general elevation of a railroad car, showing my apparatus attached.

Figure 2 is a longitudinal section.

Figure 3 is a cross-section.

Figure 4 shows another mode of connecting the upper and lower chambers.

A is a cylindrical horizontal vessel, having a diaphragm or tight partition, $a'$, in the center, so as to divide it into two chambers or tanks, B B'.

Within the lower tank B' is a long basket, G, which is filled with iron turnings or filings.

This basket is inserted at the end of the cylinder A; it slides loosely within a perforated guide-tube, H, which permits of the free access of the dilute acid to the turnings, and escape of the gas, and prevents the basket G from rolling about.

The end of the guide-tube H is closed by a tight-fitting screw-plug, $h'$, in the end of the cylinder A, through which the basket is withdrawn.

The upper chamber B is used as a tank for dilute sulphuric acid; it is filled through the inlet K.

The upper tank B is connected with the lower, B', by a pipe, L, having a stop-cock, M; this pipe L enters at the bottom of the chamber B, and also close at the bottom of the chamber B' below the basket G.

If the cock M is dispensed with, the pipe L may be placed inside the cylinder A, as shown in fig. 4.

In this case it answers as a communication for the displacement of the liquid from the lower chamber, but the liquid cannot be retained in the upper chamber B during the removal of the sediment from the lower tank, as it can when there is a cock.

K' is a mud-hole plug through which the sediment is extracted.

The hydrogen gas escapes from the lower chamber B' up through the pipe N into the horizontal cylindrical carbureting-box P, packed with saturated wick.

The pipe N enters this box by a raised elbow, $n'$, which thereby prevents any gasoline or other hydrocarbon liquid from descending the said pipe. It then passes horizontally along the bottom of the box P within a perforated sheath, O, which prevents the saturated packing from clogging the openings in the pipe N.

R is an inlet-valve, through which the saturated packing $m'$ is charged with gasoline.

S are union joints, having India-rubber washers $s'$, for making air-tight joints, and by which the box P is connected to the cylinder A.

In fig. 1 this gas apparatus is represented at W as secured beneath the body of a car, and connected to pipes X and gas-burners $x'$.

The end of the apparatus is here shown with the plug, $h'$, through which the machine can be charged with iron turnings while in position under the car.

The operation of the machine is in this way:

The cap $h'$ is unscrewed and the basket G filled with iron turnings, returned to its place, and the cap $h'$ secured.

The tank B is filled with dilute acid, which runs down the connecting-pipe L into the lower chamber B'.

The contact of the liquid and iron turnings generates hydrogen gas, which passes up the pipe N into the carbureting-box P, where it passes through the saturated packing $m'$ as carbureted hydrogen gas, and thence to the burner T.

It is not essential that the box P should be over the cylinder A; it may be at one side, with the pipe N passing out at the side near the top of the chamber B'.

When too much gas is generated, the pressure of the gas within the chamber B' forces the liquid up the pipe L out of contact with the iron filings, and no more gas is generated; when the pressure falls the liquid returns again to the lower chamber. In this manner the machine itself regulates the quantity of gas made.

The cock M is for retaining the liquid in the upper chamber while the sediment is being withdrawn through mud-hole K, thus avoiding the drawing off of the liquid on every removal of the deposit.

I do not claim the arrangement or placing of an air-carbureting apparatus beneath or outside a railroad car, as that was made and used before the date of my invention.

My invention relates to modifications in the apparatus for "generating and carbureting hydrogen gas," which modifications adapt the apparatus for use beneath railroad cars, and for other analagous uses and places.

What I claim as my invention, and desire to secure by Letters Patent, is—

1. The horizontal cylindrical vessel A, constructed with a partition $a'$ and outlet $h'$ and draw-tube basket G, circulating pipe L, arranged and combined as and for the purpose herein described.

2. A machine for generating hydrogen gas, so constructed of a horizontal tube A, containing a perforated guide-tube, H, and horizontal draw-tube basket G, as to be adapted to its position beneath railway cars, for the purpose herein described.

JOSEPH S. WOOD.

Witnesses:
   EDWD. BROWN,
   JOS. RABY.